US009432860B1

(12) United States Patent
Khanka et al.

(10) Patent No.: US 9,432,860 B1
(45) Date of Patent: Aug. 30, 2016

(54) METHOD AND SYSTEM FOR RESPONDING TO A RECEPTION FAILURE OF A REVERSE LINK SIGNAL

(75) Inventors: Bhagwan Khanka, Lenexa, KS (US); Debasish Sarkar, Irvine, CA (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1606 days.

(21) Appl. No.: 12/783,128

(22) Filed: May 19, 2010

(51) Int. Cl.
*H04W 72/00* (2009.01)
*H04W 24/08* (2009.01)

(52) U.S. Cl.
CPC .................. *H04W 24/08* (2013.01)

(58) Field of Classification Search
USPC ............... 455/450, 451, 452.1, 452.2, 453
See application file for complete search history.

(56) References Cited

U.S. PATENT DOCUMENTS

| | | | |
|---|---|---|---|
| 6,246,872 B1 | 6/2001 | Lee et al. | |
| 6,334,047 B1 * | 12/2001 | Andersson et al. | ............ 455/69 |
| 6,480,472 B1 | 11/2002 | Jou et al. | |
| 6,633,760 B1 | 10/2003 | Ham et al. | |
| 6,745,031 B2 | 6/2004 | Chun et al. | |
| 6,754,498 B2 | 6/2004 | Chun et al. | |
| 7,010,319 B2 | 3/2006 | Hunzinger | |
| 7,130,667 B2 | 10/2006 | Jin et al. | |
| 7,570,976 B2 | 8/2009 | Jin et al. | |
| 2002/0068572 A1 | 6/2002 | Chun et al. | |
| 2002/0090947 A1 | 7/2002 | Brooks et al. | |
| 2005/0164742 A1* | 7/2005 | Rajkotia | ........................ 455/561 |
| 2008/0207246 A1 | 8/2008 | Shanbhag et al. | |

OTHER PUBLICATIONS

3rd Generation Partnership Project 2, "Upper Layer (Layer 3) Signaling Standard for cdma2000 Spread Spectrum Systems," Revision E, 3GPP2 C.S0005-E, Sep. 2009.
U.S. Appl. No. 12/783,532, filed May 19, 2010.

* cited by examiner

*Primary Examiner* — Vladimir Magloire
*Assistant Examiner* — Sayed T Zewari

(57) ABSTRACT

A radio access network (RAN) allocates a resource, such as a forward traffic channel, to a mobile station that is engaged in a call. During the call, the RAN monitors a reverse link signal that is received from the mobile station. If the RAN detects a reception failure, such as the receipt of an errored frame in the reverse link signal, the RAN determines the power level that the mobile station used to transmit the reverse link signal when the reception failure occurred. If the mobile station was already transmitting at its maximum power level, the RAN may immediately release the resource. Otherwise, the RAN defines a test period that is sufficient for the mobile station to increase its transmit power to the maximum level. If the reception failure continues throughout the test period, the RAN may then release the resource.

19 Claims, 3 Drawing Sheets

METHOD AND SYSTEM FOR RESPONDING TO A RECEPTION FAILURE OF A REVERSE LINK SIGNAL

BACKGROUND

In wireless telecommunication networks, such as cellular wireless networks, a radio access network (RAN) may communicate with a mobile station by transmitting forward link signals and the mobile station may communicate with the RAN by transmitting forward link signals. When the mobile station is engaged in a call, the RAN may transmit signals to the mobile station over a forward traffic channel and the mobile station may transmit signals to the RAN over a reverse traffic channel. The forward traffic channel may be a dedicated channel that the RAN allocates to the mobile station for the call.

During the call, the RAN may monitor the reverse link signals that the mobile station transmits over the reverse traffic channel. If the RAN determines that it has lost contact with the mobile station, the RAN may release the forward traffic channel that it had allocated to the mobile station for the call. In a conventional approach, the RAN determines that it has lost contact with the mobile station when the RAN fails to receive usable reverse traffic channel frames during a fixed period of time, such as 5 seconds. Thus, when the RAN receives a bad frame over the reverse traffic channel, the RAN may start a call drop timer. If the RAN begins to receive good frames before the call drop timer expires, then the RAN maintains the call. Otherwise, the RAN considers the call to have been dropped, and the RAN releases the forward traffic channel and/or other resources that had been allocated for the call.

OVERVIEW

In a first principal aspect, an exemplary embodiment provides a method for determining whether to release at least one resource that a radio access network (RAN) has allocated to a mobile station. The RAN receives a reverse link signal that is wirelessly transmitted by the mobile station. A reception failure of the reverse link signal is detected. The reception failure occurs at a first time. A first transmit power level at which the mobile station was transmitting the reverse link signal at the first time is determined. A test period is defined. The test period is sufficient to allow the mobile station to increase its transmit power from the first transmit power level to a second transmit power level. It is determined whether the reception failure continues throughout the test period. If the reception failure continues throughout the test period, the RAN releases the at least one resource.

In a second principal aspect, an exemplary embodiment provides a method for determining whether to release at least one resource that a radio access network (RAN) has allocated to a mobile station. The RAN receives a reverse link signal that is wirelessly transmitted by the mobile station. A reception failure of the reverse link signal is detected. The reception failure occurs at a first time. It is determined whether the mobile station was transmitting the reverse link signal at a maximum transmit power level at the first time. If the mobile station was transmitting at the maximum transmit power level at the first time, the RAN releases the at least one resource.

In a third principal aspect, an exemplary embodiment provides a wireless system comprising: (i) a transceiver system for receiving a reverse link signal transmitted by a mobile station over a reverse traffic channel and for transmitting a forward link signal to said mobile station over a forward traffic channel and (ii) a controller for controlling the transceiver system. The controller is configured to respond to a reception failure of the reverse link signal, determine a first transmit power level that the mobile station used to transmit the reverse link signal when the reception failure occurred, and, in response to the first transmit power level being a maximum transmit power level, instruct the transceiver system to release the forward traffic channel.

DETAILED DESCRIPTION OF EXEMPLARY EMBODIMENTS

1. Introduction

Figure 1:
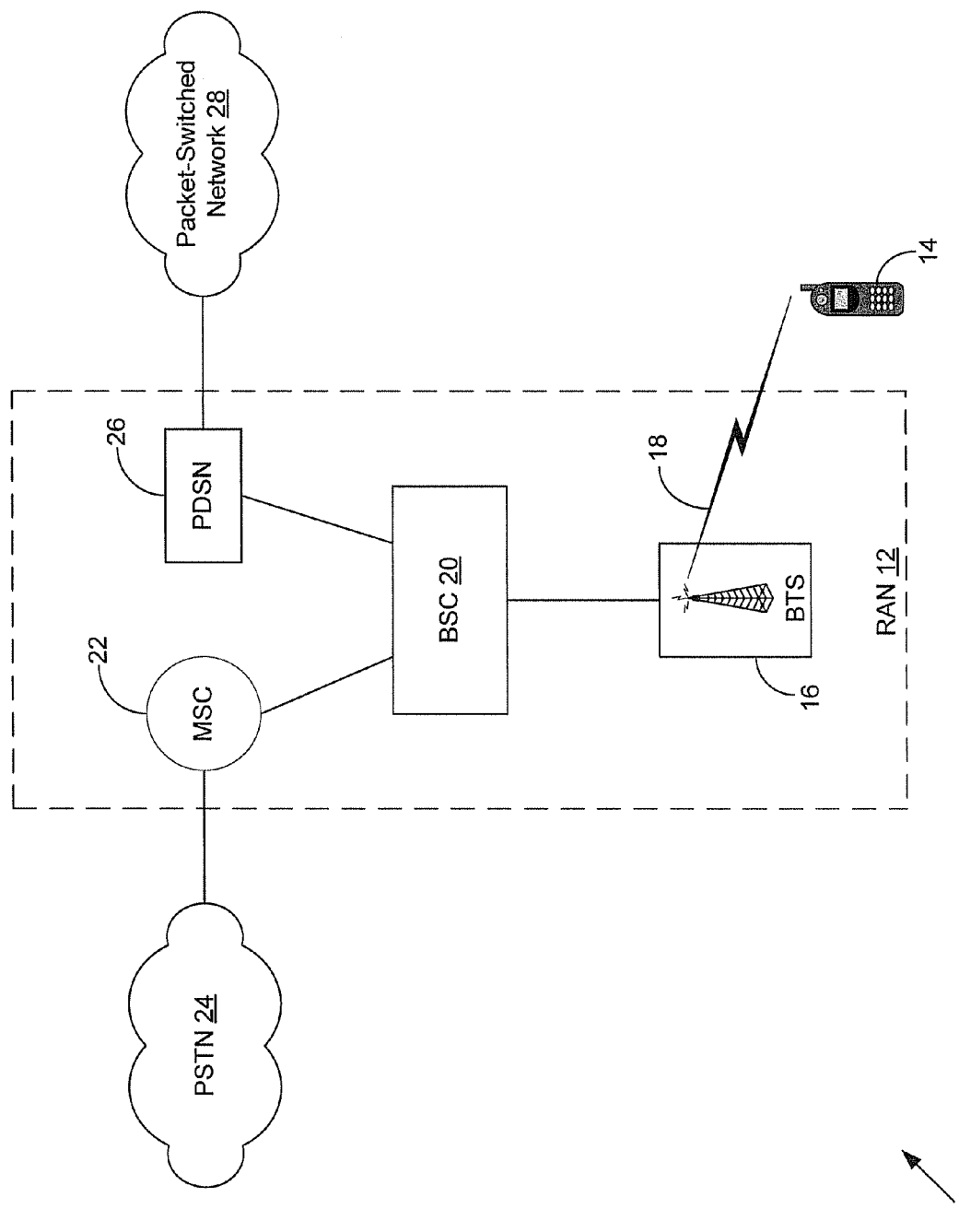
FIG. 1 is a block diagram of a wireless telecommunications network, in accordance with an exemplary embodiment.

The inventors have recognized that the conventional approach of using a fixed period of time to determine when a RAN has lost contact with a mobile station can lead to inefficiencies. For example, if the mobile station is already transmitting at its maximum transmit power level when the RAN begins receiving bad frames, then the RAN's reception of the reverse links signal is unlikely to improve. As a result, it may be inefficient for the RAN to wait for the entire fixed period of time before releasing resources. On the other hand, if the mobile station is not already transmitting at its maximum transmit power level, then the RAN's reception of the reverse link signal may improve after the mobile station has increased its transmit power level. In that case, it may be beneficial for the RAN to allow sufficient time for the mobile station to increase its transmit power level (e.g., up to the mobile station's maximum transmit power level) before releasing resources.

Accordingly, the inventors propose methods and systems in which a test period for deciding whether the RAN should releases resources allocated to a mobile station is dynamically determined, instead of set at a fixed period of time. The dynamic determination of the test period may be triggered by the RAN detecting a reception failure of a reverse link signal transmitted by the mobile station (e.g., when the mobile station is involved in a call).

Different criteria could be used for defining when a reception failure is detected. In one approach, a reception failure may be detected whenever the RAN detects an errored frame or a missing frame in a series of frames transmitted by the mobile station over a reverse traffic channel. In another approach, a reception failure may be detected whenever the RAN detects a certain consecutive number of errored or missing frames. Other criteria could also be used.

In response to detecting a reception failure, the RAN may determine the transmit power level at which the mobile station was transmitting the reverse link signal when the reception failure occurred. If this transmit power level is already at the mobile station's maximum transmit power level (or at some other sufficiently high level), then the RAN may release resources that it had allocated to the mobile station. Otherwise, the RAN may define a test period that will determine whether to release resources. The test period may be defined so as to be sufficient to allow the mobile station to increase its transmit power level to a selected higher level, such as the mobile station's maximum transmit power level. For example, the mobile station may be configured to increase its transmit power level in response to power control commands from the RAN. In that case, the test period may be defined based on the period of time it would take for the RAN to transmit power control commands that would cause the mobile station to increase its transmit power level to the selected higher level.

Once the test period is defined, the RAN may monitor the reverse link signal transmitted by the mobile station to determine whether the reception failure continues throughout the test period. Various criteria may be used to determine whether the reception failure continues throughout the test period. In some cases, the reception failure may be considered to continue throughout the test period when the RAN fails to receive any non-errored frame during the test period. In other cases, the reception failure may be considered to continue throughout the test period when the RAN fails to receive a sufficient number of consecutive non-errored frames. Other criteria could also be used.

If it is determined that the reception failure continues throughout the test period, then the RAN may release one or more resources that had been allocated to the mobile station. For example, if the RAN allocated a forward traffic channel for a call involving the mobile station, the RAN may stop transmitting over the forward traffic channel and/or may make the forward traffic channel available for other calls, thereby dropping the call. The RAN may also release other types of resources. For example, if the mobile station was assigned a network address, such as an IPv4 or IPv6 address, the RAN may clear one or more associations between the mobile station and that network address so that the network address can be assigned to a different mobile station.

If it is determined that the reception failure does not continue throughout the test period, the RAN may maintain the resources that were allocated to the mobile station. Thus, if the mobile station is involved in a call, the call could be maintained. However, the RAN may also take further action to try to improve the quality of the call. For example, the RAN may instruct the mobile station to begin communicating with an additional base station.

As noted above, when the RAN detects a reception failure of the mobile station's reverse link signal, the transmit power level that the mobile station was using to transmit the reverse link signal when reception failure occurred may be determined. This determination could be made in different ways. In one approach, the RAN may refer to a report of the mobile station's transmit power level that the RAN received prior to the occurrence of the reception failure. The report may identify a reported transmitted power level that the mobile station used to transmit the reverse link signal at a reported time prior to the occurrence of reception failure. The RAN may then identify the prior power control commands that the RAN transmitted to the mobile station from the reported time up to the time when the reception failure occurred. The mobile station's transmit power level at the time when the reception failure occurred may then be calculated based on how the mobile station would have adjusted its transmit power in response to the prior power control commands.

The RAN may receive reports of the mobile station's transmit power level in various ways. As one example, the mobile station may transmit such reports to the RAN periodically. As another example, the mobile station may transmit a report of its transmit power level in response to a request from the RAN. The RAN may request a report of the mobile station's transmit power level periodically and/or in response to detecting a potential problem with the mobile station's signal (e.g., a low received power level at the RAN, a high frame error rate, or the detection of a bad frame).

By dynamically determining test periods in this way, the RAN may release resources more quickly in those cases in which reception of the mobile station's reverse link signal is unlikely to improve. This, in turn, may beneficially result in more resources being available for other calls.

2. Exemplary Wireless Telecommunications Network

FIG. 1 is a block diagram of a wireless telecommunications network 10 in which exemplary embodiments may be employed. Wireless telecommunications network 10 includes a radio access network (RAN) 12 that can wirelessly communicate with mobile stations, such as mobile station 14. Mobile station 14 could be, for example, a wireless telephone, wireless personal digital assistant, wirelessly-equipped computer, or other wireless communication device.

To support wireless communication with mobile stations, such as mobile station 14, RAN 12 may include one or more wireless access points, exemplified in FIG. 1 by base transceiver station (BTS) 16. BTS 16 has a wireless coverage area (e.g., a cell or one or more sectors) within which BTS 16 can wirelessly communicate with mobile stations. For example, BTS 16 may communicate with mobile station 14 over an air interface 18, as shown in FIG. 1. The wireless communications between BTS 16 and mobile station 14 over air interface 18 may be in accordance with a protocol such as 1×RTT CDMA, EVDO, GSM, WiMAX (IEEE 802.16), WiFi (IEEE 802.11), UMTS, LTE, or other wireless communication protocol.

Although FIG. 1 shows RAN 12 with only one wireless access point (BTS 16), it is to be understood that RAN 12 may include a greater number. RAN 12 may also include a controller, such as base station controller (BSC) 20, that controls one or more wireless access points, such as BTS 16. For example, when BTS 16 and mobile station 14 are involved in a call, BSC 20 may be involved in detecting and responding to a reception failure of a reverse link signal from mobile station 14.

RAN 12 may, in turn, be communicatively coupled to one or more other types of networks. For example, RAN 12 may include a mobile switching center (MSC) 22 that is communicatively coupled to a circuit-switched network, such as PSTN 24, and to BSC 20. Alternatively or additionally, RAN 12 may include a packet data serving node (PDSN) 26 that is communicatively coupled to a packet-switched network 28, such as the Internet, and to BSC 20. It is to be understood, however, that RAN 12 could be communicatively coupled to other types of networks and/or could be configured in other ways.

With the configuration of RAN 12 shown in FIG. 1, mobile station 14 may be able to engage in a voice call with one or more endpoints via PSTN 24. Such endpoints could be for example, landline stations or other mobile stations. Mobile station 14 may also be able to engage in a data call with one or more endpoints via packet-switched network 28.

Such data calls may involve the exchange of voice (e.g., VoIP communications), data, video, and/or other media, with endpoints such as VoIP devices, e-mail servers, Web servers, gaming servers, instant messaging servers, or streaming media servers.

3. Exemplary Method

Figure 2:
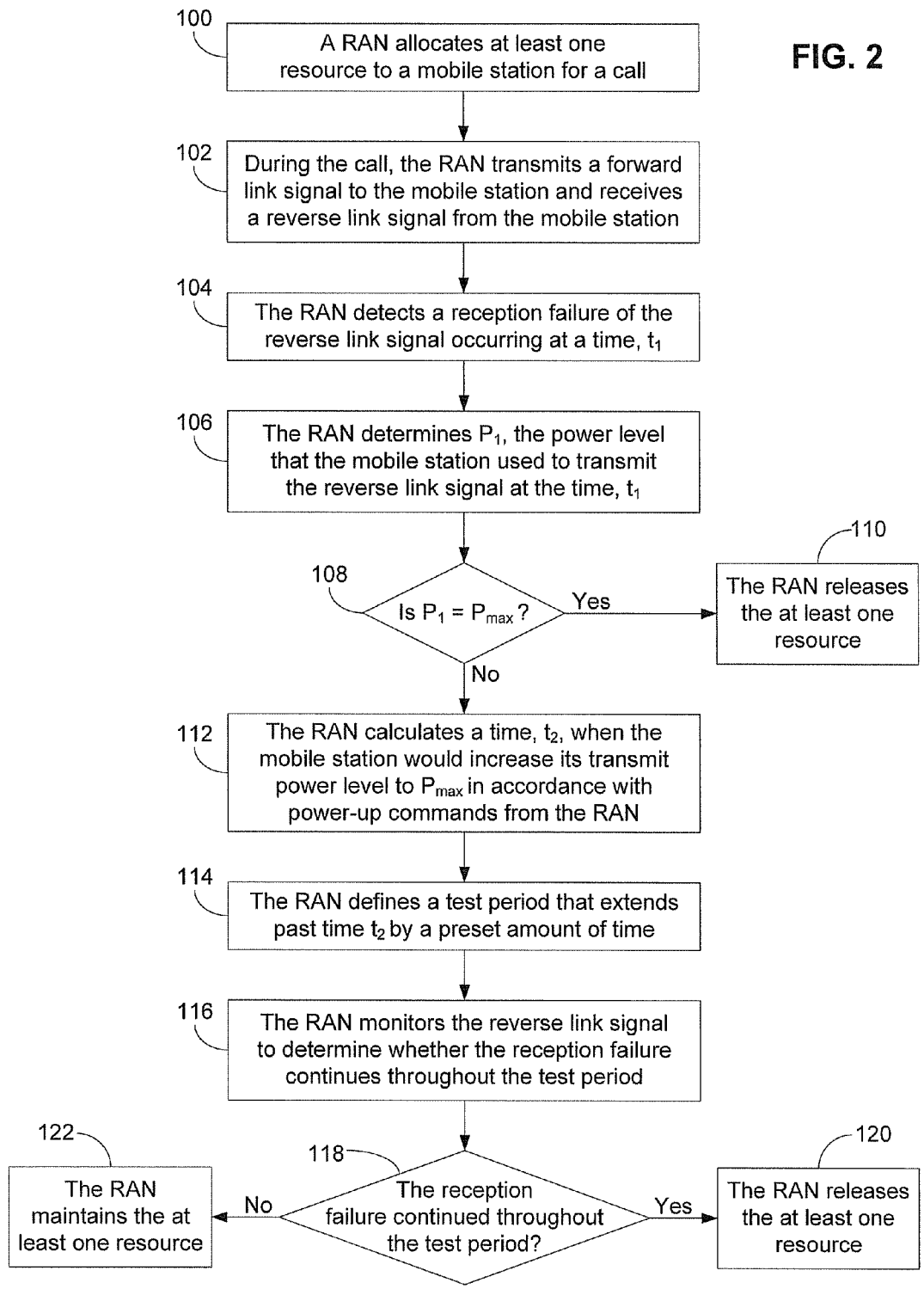
FIG. 2 is a flowchart of a method in which a radio access network (RAN) responds to a reception failure of a reverse link signal from a mobile station, in accordance with an exemplary embodiment.

FIG. 2 is a flow chart illustrating an exemplary method. For purposes of illustration, FIG. 2 is described with reference to the configuration of wireless telecommunications network 10 shown in FIG. 1. It is to be understood, however, that other configurations could be used.

The method begins when a RAN (e.g., RAN 12) allocates at least one resource to a mobile station (e.g., mobile station 14) for a call, as indicated by block 100. The call could be, for example, a voice call (e.g., a call carried over PSTN 24) or a data call (e.g., a call carried over packet-switched network 28). The one or more resources that the RAN allocates to the call could include, for example, a forward traffic channel, a reverse traffic channel, Walsh codes, time slots, a network address (e.g., an IPv4 or IPv6 address), and/or other resources. The RAN may allocate the one or more resources during the process of setting up the call. For example, the RAN may allocate the one or more resources in response to a request from the mobile station to originate a call, or in response to a request from an endpoint (e.g., an endpoint connected to PSTN 24 or to packet-switched network 28) to establish a call to the mobile station.

During the call, the RAN may transmit a forward link signal (e.g., using a forward traffic channel) to the mobile station and the RAN may receive a reverse link signal (e.g., over a reverse traffic channel) from the mobile station, as indicated by block 102. With reference to FIG. 1, the forward link and reverse link signals could be exchanged between BTS 16 and mobile station 14 over air interface 18.

During the call, the RAN may monitor the signal quality of the reverse link signal from the mobile station, for example, with respect to signal strength and error rate. Based on the signal quality of the reverse link signal received by the RAN, the RAN may send power control commands that instruct the mobile station to either increase or decrease the power level at which the mobile station is transmitting the reverse link signal. For example, the RAN may transmit a power-up command that instructs the mobile station to increase its transmit power level by a fixed increment or a power-down command that instructs the mobile station to decrease its transmit power level by the fixed increment. The mobile station may similarly monitor the forward link signal from the RAN and may send power control commands to the RAN based on the signal quality of the forward link signal received by the mobile station.

At some point, the RAN detects a reception failure of the reverse link signal (the reception failure occurring at a time, $t_1$), as indicated by block 104. The RAN may detect a reception failure in various ways. In an exemplary embodiment, the mobile station transmits the reverse link signal in a series of coded frames. For each coded frame that the RAN receives, the RAN decodes it, and then determines whether the frame was received with an error, for example, by using a cyclic redundancy check (CRC). If an error is detected, the RAN may consider the frame to be a "bad" or errored frame and may consider a reception failure of the reverse link signal to have occurred. Alternatively, the RAN may use other criteria for detecting a reception failure, such as receiving a particular number of consecutive bad frames or receiving a particular number of bad frames within a given time period. Other criteria for detecting a reception failure could also be used.

In some cases, such as when the reverse link signal experiences a deep fade, the RAN may fail to receive a frame altogether. In such cases, the RAN may consider the missing frame to be an errored frame and apply the same criteria used for errored frames for determining whether a reception failure has occurred. Alternatively, the RAN may apply different criteria for a missing frame. For example, the RAN might consider a reception failure to have occurred as soon as a missing frame is detected but may require two or more consecutive errored frames before determining a reception failure based on errored frames.

When the RAN determines that a reception failure of the reverse link signal has occurred, the RAN determines $P_1$, the power level that the mobile station used to transmit the reverse link signal at the time $t_1$, as indicated by block 106. The RAN may determine $P_1$ in various ways. In an exemplary embodiment, the RAN refers to the most recent report from the mobile station of its transmit power level. The report may identify a reported transmit power level that the mobile station used to transmit the reverse link signal at a reported time, $t_0$, prior to the time $t_1$. The RAN may then infer $P_1$, the transmit power level that the mobile station used at the time $t_1$, by identifying the power control commands that the RAN transmitted to the mobile station between the times $t_0$ and $t_1$ and calculating how the mobile station would have adjusted its transmit power in accordance with those power control commands.

Once the RAN has determined $P_1$, the RAN may determine whether $P_1$ is equal to $P_{max}$, the mobile station's maximum transmit power level, as indicated by block 108. The mobile station's maximum transmit power level could depend, for example, on the mobile station's device class and/or the user's subscription level. Alternatively, the mobile station's maximum transmit power level could be set by the RAN, e.g., based on network policies.

If $P_1$ is equal to $P_{max}$, the RAN may release the at least one resource allocated to the mobile station for the call, as indicated by block 110. In some embodiments, the RAN may release the at least one resource immediately. Alternatively, the RAN may start a timer (e.g., a timer that is much shorter than a conventional call drop timer) to allow a certain period of time for the reverse link signal to recover before releasing the at least one resource.

If $P_1$ is less than $P_{max}$, then the RAN may calculate a time, $t_2$, when the mobile station would increase its transmit power level to $P_{max}$ in accordance with power-up control commands from the RAN, as indicated by block 112. For example, the RAN may identify a sequence of N power-up commands that would, in combination, instruct the mobile station to increase its transmit power level from $P_1$ to $P_{max}$. The RAN may then determine $t_2$ based on the time it would take the RAN to transmit the power-up commands to the mobile station (e.g., the RAN may transmit power control commands in accordance with a preset schedule) and for the mobile station to adjust its transmit power level in response to the power-up commands.

Figure 3:
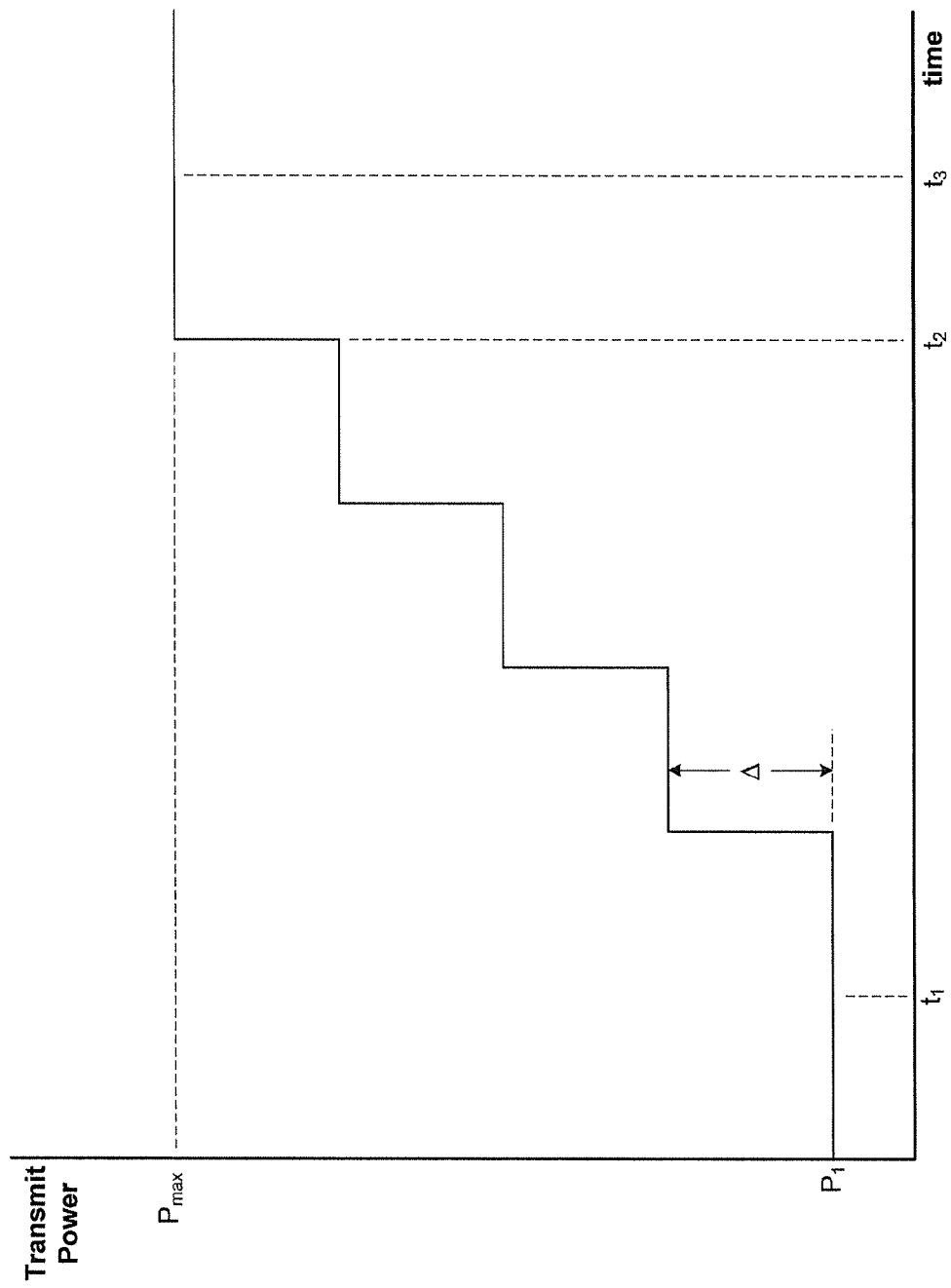
FIG. 3 is a graph of a mobile station's transmit power level as a function of time, in accordance with an exemplary embodiment.

FIG. 3 illustrates an example in which four power-up commands are sufficient to raise the mobile station's transmit power level from $P_1$ to $P_{max}$. In particular, each power-up command instructs the mobile station to increase its transmit power level by a fixed power increment, $\Delta$, and four of these fixed power increments makes up for a difference between $P_1$ and $P_{max}$ (i.e., $4\Delta \geq P_{max} - P_1$). As shown in FIG. 3, the time $t_2$ is the time when the mobile station begins transmitting at the power level $P_{max}$, after receiving four power-up commands from the RAN.

The RAN then defines a test period based on $t_2$. For example, the RAN may define the test period so that it extends past $t_2$ by a preset amount of time, as indicated by block 114. In FIG. 3, the end of the test period is at time $t_3$.

The RAN then monitors the reverse link signal to determine whether the reception failure continues throughout the test period, as indicated by block 116. For example, the RAN may continue to receive and decode frames transmitted in the mobile station's reverse link signal. If the frames continue to be errored (or missing) until the end of the test period, the RAN may determine that the reception failure has continued throughout the test period. On the other hand, if the RAN receives a "good" or non-errored frame during the test period, the RAN may consider the reception failure to have ended during the test period. Alternatively, the RAN may apply other criteria for determined whether the reception failure has ended. For example, the RAN may require a particular number of consecutive good frames in order to determine that the reception failure has ended.

During the test period, the RAN continues to send power control commands to the mobile station. The power control commands sent by the RAN could be the sequence of power-up commands that the RAN used to define the test period. Thus, in the example of FIG. 3, the RAN determined that four power-up commands would be sufficient to raise the mobile station's transmit power level to $P_{max}$. After defining the test period based on the time it would take to transmit these four power-up commands, the RAN may transmit the four power-up commands and the mobile station may, in response, increase its transmit power level in a step-wise fashion as shown in FIG. 3. It is to be understood, however, that if reception conditions improve during the test period (e.g., the reception failure ends during the test period), then the RAN might not end up transmitting all of the anticipated power-up commands.

Whether the RAN releases or maintains the at least one resource allocated to the mobile station depends on whether the reception failure continued throughout the test period, as indicated by block 118. If the RAN determines that the reception failure continued throughout the test period, the RAN releases the at least one resource, as indicated by block 120. If not (i.e., the RAN determines that the reception failure ended during the test period), the RAN maintains the at least one resource, as indicated by block 122.

In this way, the RAN may respond to a reception failure in a dynamic manner. In this dynamic approach, the RAN defines a test period that is used to decide whether to release or maintain at least one resource allocated to a mobile station. The test period may be defined based on the time it takes for the mobile station to increase its transmit power level from the power level used when the reception failure occurred to a higher power level (such as a maximum power level). This dynamic approach may beneficially allow the RAN to use its resources more efficiently.

The functions described above with respect to FIG. 2 may be divided among various elements of the RAN in various ways. For example, a transceiver system (e.g., BTS 16) may be configured to perform functions related to transmitting forward link signals to mobile stations and receiving reverse link signals from mobile stations. A controller (e.g., BSC 20) may be configured to perform functions related to managing resources used in the RAN, such as instructing transceiver systems with respect to allocating, maintaining, or releasing resources used by mobile stations. The controller may also be configured to detect and to respond to a reception failure of a reverse link signal from a mobile station. For example, the controller may be configured to determine a transmit power level that the mobile station used to transmit the reverse link signal when the reception failure occurred, define a test period that is sufficient to allow the mobile station to increase its transmit power level to a higher power level (e.g., the mobile station's maximum power level), and to determine whether the reception failure continues throughout the test period.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for determining whether to release at least one resource that a radio access network (RAN) has allocated to a mobile station, said method comprising:
   said RAN receiving a reverse link signal that is wirelessly transmitted by said mobile station;
   said RAN detecting a reception failure of said reverse link signal, said reception failure occurring at a first time;
   said RAN determining that said mobile station was transmitting said reverse link signal at a first transmit power level at said first time;
   said RAN defining a test period based on said first transmit power level, such that said test period is sufficient to allow said mobile station to increase its transmit power from said first transmit power level to a second transmit power level;
   said RAN determining whether said reception failure continues throughout said test period; and
   if said reception failure continues throughout said test period, said RAN releasing said at least one resource.

2. The method of claim 1, wherein said mobile station is involved in a call with an endpoint via said RAN.

3. The method of claim 2, wherein said at least one resource includes a forward traffic channel that said RAN allocated for said call.

4. The method of claim 1, wherein said reverse link signal comprises a series of frames, and wherein said RAN detecting a reception failure of said reverse link signal comprises:
   determining that a frame of said reverse link signal that said RAN received at said first time was an errored frame.

5. The method of claim 4, wherein said RAN determining whether said reception failure continues throughout said test period comprises:
   determining whether said RAN receives a non-errored frame during said test period.

6. The method of claim 1, wherein said second transmit power level is a maximum transmit power level.

7. The method of claim 1, wherein said RAN defining a test period based on said first transmit power level, such that test period is sufficient to allow said mobile station to increase its transmit power from said first transmit power level to a second transmit power level comprises:
   selecting a sequence of one or more power control commands that would instruct said mobile station to increase its transmit power from said first transmit power level to said second transmit power level;
   determining a second time when said mobile station would begin transmitting at said second transmit power level in accordance with said sequence of one or more power control commands; and defining said test period so as to include said second time.

8. The method of claim 7, wherein defining said test period so as to include said second time comprises:

defining said test period so that it extends past said second time by a preset amount of time.

9. The method of claim 7, wherein said sequence of one or more power control commands comprises N power-up commands, wherein each of said power-up commands instructs said mobile station to increase its transmit power by a fixed power increment.

10. The method of claim 9, wherein selecting a sequence of one or more power control commands that would instruct said mobile station to increase its transmit power from said first transmit power level to said second transmit power level comprises:

selecting N such that N of said fixed power increments makes up for a difference between said first and second transmit power levels.

11. The method of claim 7, wherein determining a second time when said mobile station would begin transmitting at said second transmit power level in accordance with said sequence of one or more power control commands comprises:

determining said second time based on when said RAN would complete a transmission of said sequence of one or more power control commands to said mobile station.

12. The method of claim 11, further comprising:

said RAN transmitting said sequence of one or more power control commands to said mobile station during said test period.

13. The method of claim 1, wherein said RAN determining that said mobile station was transmitting said reverse link signal at a first transmit power level at said first time comprises:

identifying a reported transmit power level that said mobile station used to transmit said reverse link signal at a reported time prior to said first time;

identifying prior power control commands that said RAN transmitted to said mobile station between said reported time and said first time; and calculating said first transmit power level based on how said mobile station would have adjusted its transmit power in accordance with said prior power control commands.

14. A method for determining whether to release at least one resource that a radio access network (RAN) has allocated to a mobile station, said method comprising:

said RAN receiving a reverse link signal that is wirelessly transmitted by said mobile station;

said RAN detecting a reception failure of said reverse link signal, said reception failure occurring at a first time;

said RAN determining whether said mobile station was transmitting said reverse link signal at a maximum transmit power level at said first time;

if said mobile station was transmitting at said maximum transmit power level at said first time, said RAN releasing said at least one resource;

if said mobile station was transmitting at less than said maximum transmit power level at said first time, said RAN defining a test period that is sufficient to allow said mobile station to increase its transmit power to said maximum transmit power level;

said RAN determining whether said reception failure continues throughout said test period; and if said reception failure continues throughout said test period, said RAN releasing said at least one resource.

15. The method of claim 14, wherein said RAN defining a test period that is sufficient to allow said mobile station to increase its transmit power to said maximum transmit power level comprises:

selecting a sequence of one or more power control commands that would instruct said mobile station to increase its transmit power to said maximum transmit power level;

determining a second time when said mobile station would begin transmitting at said maximum transmit power level in accordance with said sequence of one or more power control commands; and defining said test period so as to include said second time.

16. A wireless system, comprising:

a transceiver system for receiving a reverse link signal transmitted by a mobile station over a reverse traffic channel and for transmitting a forward link signal to said mobile station over a forward traffic channel; and a controller for controlling said transceiver system, wherein said controller is configured to respond to a reception failure of said reverse link signal, determine a first transmit power level that said mobile station used to transmit said reverse link signal when said reception failure occurred, and define a test period based on said first transmit power level, such that said test period is sufficient to allow said mobile station to increase its transmit power from said first transmit power level to a second transmit power level.

17. The wireless system of claim 16, wherein said controller is further configured to, if said reception failure continues throughout said test period, instruct said transceiver system to release said forward traffic channel.

18. The wireless system of claim 16, wherein said transceiver system is a base transceiver station (BTS), and wherein said controller is a base station controller (BSC) that is communicatively coupled to said BTS.

19. The wireless system of claim 16, wherein said second transmit power level is a maximum transmit power level.

* * * * *